(12) United States Patent
Alewijn

(10) Patent No.: US 11,536,399 B2
(45) Date of Patent: Dec. 27, 2022

(54) BUNDLE OF PIPELINES AND SPACER FOR USE IN SUCH A BUNDLE OF PIPELINES

(71) Applicant: Lankhorst Engineered Products B.V., Sneek (NL)

(72) Inventor: Gijs Alewijn, Ijlst (NL)

(73) Assignee: HEINEKEN SUPPLY CHAIN B.V., Amsterdam (NL)

( * ) Notice: Subject to any disclaimer, the term of this patent is extended or adjusted under 35 U.S.C. 154(b) by 0 days.

(21) Appl. No.: 17/427,993

(22) PCT Filed: Feb. 13, 2020

(86) PCT No.: PCT/NL2020/050078
§ 371 (c)(1),
(2) Date: Aug. 3, 2021

(87) PCT Pub. No.: WO2020/167120
PCT Pub. Date: Aug. 20, 2020

(65) Prior Publication Data
US 2022/0120360 A1    Apr. 21, 2022

(30) Foreign Application Priority Data
Feb. 14, 2019 (NL) .................................... 2022577

(51) Int. Cl.
| *F16L 3/237* | (2006.01) |
| *F16L 1/20* | (2006.01) |
| *F16L 3/10* | (2006.01) |

(52) U.S. Cl.
CPC ................. *F16L 3/237* (2013.01); *F16L 1/20* (2013.01); *F16L 3/105* (2013.01); *F16L 3/1058* (2013.01)

(58) Field of Classification Search
CPC ... F16L 3/237; F16L 1/20; F16L 3/105; F16L 3/1058
(Continued)

(56) References Cited

U.S. PATENT DOCUMENTS

| 6,116,810 A * | 9/2000 | Eberle ..................... F16C 33/61 403/396 |
| 2003/0089829 A1* | 5/2003 | Brandzel ................. F16L 3/222 248/68.1 |

(Continued)

FOREIGN PATENT DOCUMENTS

| GB | 2247730 | 3/1992 |
| GB | 2250079 | 5/1992 |

(Continued)

OTHER PUBLICATIONS

International Search Report for corresponding International Application No. PCT/NL2020/050078 dated Jun. 2, 2020, 5 pages.

*Primary Examiner* — Muhammad Ijaz
(74) *Attorney, Agent, or Firm* — Pearne & Gordon LLP

(57) ABSTRACT

A spacer (3), for mutually spacing apart a first and a second pipeline in a mutually parallel manner, has a first and a second side (31, 32) for abutting against the two respective pipelines. At least two tensioning straps, which are extending in first and second longitudinal ranges (41, 42), are fixing the spacer relative to the first pipeline. The second side (32) has, in the first and second longitudinal ranges, a second abutment structure (52) for abutting against the second pipeline. Furthermore, the second side has, in a first intermediate longitudinal range (61), a first recessed intermediate surface portion (71). Thanks to the first recessed intermediate surface portion, the portions of the spacer which are extending in the first longitudinal range and the second longitudinal range are, under influence of tensioning forces of the tensioning straps, to a larger extent independently resiliently compressible relative to one another. This improves the effectivity of the tensioning straps.

7 Claims, 8 Drawing Sheets

(58) Field of Classification Search
USPC .......................................................... 248/68.1
See application file for complete search history.

(56) References Cited

U.S. PATENT DOCUMENTS

2012/0061529 A1* 3/2012 Hill ........................... H01R 4/48
  248/65
2019/0195394 A1* 6/2019 Harrop ....................... F16L 9/20

FOREIGN PATENT DOCUMENTS

GB      2492838      1/2013
WO    2012141583    10/2012

\* cited by examiner

BUNDLE OF PIPELINES AND SPACER FOR USE IN SUCH A BUNDLE OF PIPELINES

The invention relates to a bundle of pipelines comprising a first pipeline, a second pipeline and a plurality of bundling assemblies, wherein:

the first pipeline and the second pipeline are extending alongside one another in a mutually parallel manner in a longitudinal direction of the bundle of pipelines, wherein the bundling assemblies in the longitudinal direction are positioned at a distance from one another;

each bundling assembly comprises a spacer and at least two tensioning straps, wherein the spacer is mutually spacing apart the first pipeline and the second pipeline in a direction perpendicular to the longitudinal direction, wherein the spacer comprises a first side and a second side, lying opposite to the first side, wherein the first side is facing the first pipeline and the second side is facing the second pipeline, wherein, as seen in a circumferential direction around the longitudinal direction (10), the first side partially envelopes the first pipeline and the second side partially envelopes the second pipeline, and wherein the at least two tensioning straps in the longitudinal direction are positioned at a distance from one another, wherein each tensioning strap as one closed loop is surrounding the first pipeline, the spacer and the second pipeline together in said circumferential direction, and wherein tensioning force of the tensioning strap is fixing the spacer relative to the first pipeline;

the at least two tensioning straps comprise a first tensioning strap and a second tensioning strap, wherein the first tensioning strap is extending in a first longitudinal range in the longitudinal direction and the second tensioning strap is extending in a second longitudinal range in the longitudinal direction; and the spacer comprises, at the first side, a first abutment structure for abutting against the first pipeline and comprises, at the second side, a second abutment structure for abutting against the second pipeline, wherein the second abutment structure is extending at least in the first longitudinal range and in the second longitudinal range.

The invention further relates to a spacer for use in such a bundling assembly of such a bundle of pipelines.

Such a bundle of pipelines and such a spacer are for example known from WO 2012/141583 A1. For example, FIG. 4 of WO 2012/141583 A1 shows a longitudinal section of a bundle of pipelines. In the shown longitudinal section one can see sections of the first pipeline 11 and the second pipeline 12, as well as one of the bundling assemblies of the bundle of pipelines. The shown bundling assembly consists of the spacer 2, the covering element 3, and the three tensioning straps 7. Usually the plurality of bundling assemblies of the bundle of pipelines are positioned, in the longitudinal direction, at relatively large distances of several meters relative to one another.

FIGS. 1A and 1B of WO 2012/141583 A1 show two respective views at the spacer 2. FIG. 1B shows a view at the first side 21 of the spacer 2, wherein the first side 21 comprises the first abutment structure for abutting against the first pipeline 11. FIG. 1A shows a view at the second side 22 of the spacer 2, wherein the second side 22 comprises the second abutment structure for abutting against the second pipeline 12.

In the situation of FIG. 4 of WO 2012/141583 the tensioning straps 7 are firmly tensioned, so that the bundling assembly, consisting of the spacer 2, the covering element 3, and the three tensioning straps 7, is firmly clamped on the first pipeline 11. It is noted that in FIG. 4 the bundling assembly is not clamped on the second pipeline 12. Instead of that, in FIG. 4 the second pipeline is enveloped by the spacer 2 and the covering element 3 with some play, so that the second pipeline 12 is reciprocally movable in the longitudinal direction, relative to the first pipeline 11. In practice, such a reciprocal moveability of the second pipeline is often desirable for such bundles of pipelines.

When mounting such a bundling assembly, the tensioning straps 7 need to be firmly tensioned in order to firmly fix the spacer 2 relative to the first pipeline 11. Therein, the mounted tensioning straps in practice are usually tensioned one after the other. That is to say, at first, a first tensioning strap is maximally tensioned, next a second tensioning strap is maximally tensioned, and finally the remaining third tensioning strap is maximally tensioned. In tensioning of each tensioning strap at least the spacer will compress. This has the result that, in maximally tensioning each next tensioning strap, the tensioning strap that was previously tensioned gets a bit looser. Hence, the successive tensioning of several tensioning straps of a bundling assembly has the undesirable result that not all of said several tensioning straps are equally functional. In other words, the result is a low effectivity of the tensioning straps.

It is an object of the invention to provide a solution according to which the effectivity of the tensioning straps is improved, for example when several tensioning straps of a bundling assembly of a bundle of pipelines are tensioned one after the other.

For that purpose the invention provides a bundle of pipelines according to the appended independent claim 1, as well as a spacer according to the appended independent claim 8. Specific embodiments of the invention are provided by the appended dependent claims 2-7 and 9.

Hence, the invention provides a bundle of pipelines comprising a first pipeline, a second pipeline and a plurality of bundling assemblies, wherein:

the first pipeline and the second pipeline are extending alongside one another in a mutually parallel manner in a longitudinal direction of the bundle of pipelines, wherein the bundling assemblies in the longitudinal direction are positioned at a distance from one another;

each bundling assembly comprises a spacer and at least two tensioning straps, wherein the spacer is mutually spacing apart the first pipeline and the second pipeline in a direction perpendicular to the longitudinal direction, wherein the spacer comprises a first side and a second side, lying opposite to the first side, wherein the first side is facing the first pipeline and the second side is facing the second pipeline, wherein, as seen in a circumferential direction around the longitudinal direction (10), the first side partially envelopes the first pipeline and the second side partially envelopes the second pipeline, and wherein the at least two tensioning straps in the longitudinal direction are positioned at a distance from one another, wherein each tensioning strap as one closed loop is surrounding the first pipeline, the spacer and the second pipeline together in said circumferential direction, and wherein tensioning force of the tensioning strap is fixing the spacer relative to the first pipeline;

the at least two tensioning straps comprise a first tensioning strap and a second tensioning strap, wherein the first tensioning strap is extending in a first longitudinal range in the longitudinal direction and the second tensioning strap is extending in a second longitudinal range in the longitudinal direction; and the spacer comprises, at the first side, a first abutment structure for abutting against the first pipeline and comprises, at the second side, a second abutment structure for abutting against the second pipeline, wherein the second abutment structure is extending at least in the first longitudinal range and in the second longitudinal range;

characterized in that the second abutment structure of the spacer, as seen in the longitudinal direction, is at least partly interrupted in a first intermediate longitudinal range in-between the first longitudinal range and the second longitudinal range in that the second side of the spacer comprises, in the first intermediate longitudinal range, a first recessed intermediate surface portion, which, relative to the second abutment structure in the first longitudinal range and in the second longitudinal range, is recessed in the direction of the first abutment structure of the spacer.

The invention may further be embodied in a spacer for use in a bundling assembly of a bundle of pipelines according to the invention.

Hence, according to the invention the spacer has the special feature that the second abutment structure for the second pipeline in the first intermediate longitudinal range is at least partially interrupted by the first recessed intermediate surface portion. Thanks to this recessed interruption of the second abutment structure in-between the two tensioning straps, the portions of the spacer which are extending in the first longitudinal range and the second longitudinal range are, under influence of tensioning forces of the tensioning straps, to a larger extent independently resiliently compressible relative to one another in directions transverse to the longitudinal direction, as compared to a case where the second abutment structure for the second pipeline would have been continued in the first intermediate longitudinal range. Thanks to the mutually more independent compressibility of the concerning two longitudinal sections of the spacer, as provided by the recessed interruption, the effectivity of the two tensioning straps is improved, for example when the two tensioning straps are tensioned one after the other. Particularly, this advantage of the invention is obtained to a large extent in often occurring situations in which the bundling assembly is not clamped on the second pipeline, so that the second pipeline in the longitudinal direction is reciprocally moveable relative to the first pipeline.

In a preferable embodiment of a bundle of pipelines according to the invention:

the at least two tensioning straps further comprise a third tensioning strap, wherein the third tensioning strap is extending in a third longitudinal range in the longitudinal direction, wherein the second longitudinal range is extending in-between the first longitudinal range and the third longitudinal range; and the second abutment structure is furthermore at least extending in the third longitudinal range, and the second abutment structure, as seen in the longitudinal direction, is at least partly interrupted in a second intermediate longitudinal range in-between the second longitudinal range and the third longitudinal range in that the second side in the second intermediate longitudinal range comprises a second recessed intermediate surface portion, which, relative to the second abutment structure in the first longitudinal range and in the second longitudinal range and in the third longitudinal range, is recessed in the direction of the first abutment structure.

Thanks to such a third tensioning strap, which is extending in the third longitudinal range, and thanks to such a second recessed intermediate surface portion, which is extending in the second intermediate longitudinal range, there is obtained a clamping action, between the bundling assembly and the first pipeline, said clamping action being favourably distributed over the longitudinal direction, in combination with a stable positioning of the bundling assembly.

In a further preferable embodiment of a bundle of pipelines according to the invention:

the first abutment structure is extending at least in the first intermediate longitudinal range, and the first abutment structure, as seen in the longitudinal direction, is at least partly interrupted in the first longitudinal range and in the second longitudinal range in that the first side in the first longitudinal range and in the second longitudinal range comprises a first recessed flanking surface portion and a second recessed flanking surface portion, respectively, which, relative to the first abutment structure in the first intermediate longitudinal range, are recessed in the direction of the second abutment structure.

Thanks to the first abutment structure, the first recessed flanking surface portion and the second recessed flanking surface portion of the first side of the spacer, in combination with the second abutment structure and the first recessed intermediate surface portion of the second side of the spacer, the spacer can be designed with relatively little material, and at the same time it can withstand high forces during use, and at the same time it can be designed for being nested so that several spacers can be compactly stacked by nesting.

In a further preferable embodiment of a bundle of pipelines according to the invention:

the first abutment structure is extending at least in the first intermediate longitudinal range and in the second intermediate longitudinal range, and the first abutment structure, as seen in the longitudinal direction, is at least partly interrupted in the first longitudinal range and in the second longitudinal range and in the third longitudinal range in that the first side in the first longitudinal range and in the second longitudinal range and in the third longitudinal range comprises a first recessed flanking surface portion and a second recessed flanking surface portion and a third recessed flanking surface portion, respectively, which, relative to the first abutment structure in the first intermediate longitudinal range and in the second intermediate longitudinal range, are recessed in the direction of the second abutment structure.

Thanks to such a third tensioning strap, in combination with the first abutment structure, the first recessed flanking surface portion, the second recessed flanking surface portion and the third recessed flanking surface portion of the first side of the spacer, and in combination with the second abutment structure, the first recessed intermediate surface portion and the second recessed intermediate surface portion of the second side of the spacer, there is obtained a clamping action, between the bundling assembly and the first pipeline, said clamping action being favourably distributed over the longitudinal direction, in combination with a stable positioning of the bundling assembly, while the spacer further can be designed with relatively little material, and at the same time it can withstand high forces during use, and at the same time it can be designed for being nested so that several spacers can be compactly stacked by nesting.

In a further preferable embodiment of a bundle of pipelines according to the invention, as seen in transverse cross-section perpendicular to the longitudinal direction, the first abutment structure comprises a substantially V-shaped part, wherein the V-shaped part with the point of its V-shape faces away from the central axis of the first pipeline.

Thanks to such a V-shapedness of the first abutment structure, the spacer can be applied for first pipelines of different diameters, wherein the first abutment structure each time is reliably abutting against such first pipelines of different diameters.

In a further preferable embodiment of a bundle of pipelines according to the invention, as seen in transverse cross-section perpendicular to the longitudinal direction, the first abutment structure comprises a substantially plurally V-shaped part, wherein the plurally V-shaped part with the respective points of its plural V-shape faces away from the central axis of the first pipeline.

Such a plural V-shapedness of the first abutment structure can, under circumstances, further improve the each time reliable abutment against such first pipelines of different diameters, as compared to a singular V-shapedness of the first abutment structure.

In a further preferable embodiment of a bundle of pipelines according to the invention, each bundling assembly further comprises a covering element which comprises a third side and a fourth side lying opposite to the third side, wherein the third side is facing the second pipeline and the fourth side is facing away from the second pipeline, wherein the covering element at the third side comprises a third abutment structure for abutting against the second pipeline, wherein the covering element, by interlocking connection with the spacer, has been brought in a covering condition, wherein in said covering condition the spacer and the covering element are facing one another with the second side and the third side, respectively, wherein, as seen in said circumferential direction, the third side partially envelopes the second pipeline, and wherein each tensioning strap as one closed loop is surrounding the first pipeline, the spacer, the second pipeline and the covering element together in said circumferential direction.

Such a covering element enhances a favourable transmission of forces from the at least two tensioning straps to the spacer.

The invention may furthermore be embodied in an assembly, comprising:
  a spacer according to the invention; and
  such a covering element.

In the following, the invention is further elucidated with reference to some non-limiting embodiments and to the schematic figures in the appended drawings, wherein the following is shown.

FIG. 1 shows, in a perspective view, a longitudinal section of an example of an embodiment of a bundle of pipelines according to the invention, wherein the shown longitudinal section comprises one of the bundling assemblies of the bundle of pipelines.

FIG. 2 separately shows the spacer of the bundle of pipelines of FIG. 1 again, in the same perspective view as in FIG. 1, wherein the view is taken at the second side of the spacer.

FIG. 3 shows the separate spacer of FIG. 2 again, however this time in a perspective view at the opposed first side of the spacer.

FIG. 4 separately shows the covering element of the bundle of pipelines of FIG. 1 again, in the same perspective view as in FIG. 1, wherein the view is taken at the fourth side of the spacer.

Figure 1:
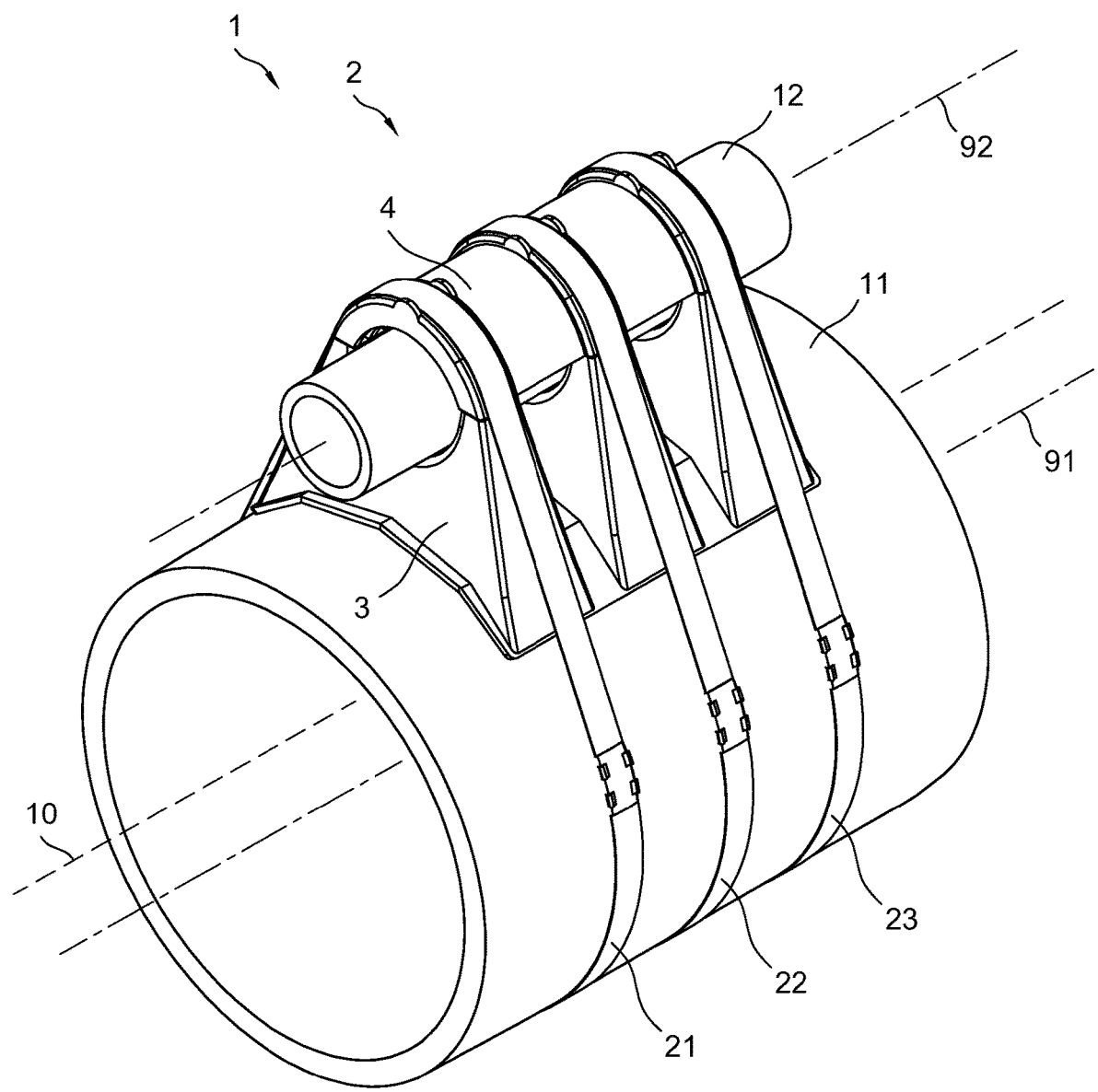

The reference signs used in the above-mentioned figures are referring to the above-mentioned parts and aspects of the invention, as well as to related parts and aspects, in the following manner.
  1 bundle of pipelines
  2 bundling assembly
  3 spacer
  4 covering element
  5 projection
  6 receiving hole
  8 V-shaped part
  9 plurally V-shaped part
  10 longitudinal direction
  11 first pipeline
  12 second pipeline
  21 first tensioning strap
  22 second tensioning strap
  23 third tensioning strap
  31 first side
  32 second side
  33 third side
  34 fourth side
  41 first longitudinal range
  42 second longitudinal range
  43 third longitudinal range
  51 first abutment structure
  52 second abutment structure
  53 third abutment structure
  61 first intermediate longitudinal range
  62 second intermediate longitudinal range
  71 first recessed intermediate surface portion
  72 second recessed intermediate surface portion
  81 first recessed flanking surface portion
  82 second recessed flanking surface portion
  83 third recessed flanking surface portion
  91 central axis of the first pipeline
  92 central axis of the second pipeline Based on the above introductory description, including the brief description of the drawing figures, and based on the above-explained reference signs used in the drawing, the shown examples of FIGS. 1-10 are for the greatest part readily self-explanatory. The following extra explanations are given.

Now, reference is first made to FIGS. 1-5. The bundle of pipelines 1, of which FIG. 1 shows a longitudinal section, is, inter alia, suitable to be laid on or in a bottom of a body of water from a vessel which is located at the surface of the body of water. Therein, the bundling assemblies 2, one of which being shown in FIG. 1, are mounted, on board of the vessel, to the concerning first pipeline 11 and second pipeline 12 to form the bundle of pipelines 1. Therein, the mounted bundling assemblies 2 are each time located, as seen in the longitudinal direction 10 of the bundle of pipelines 1, at some distance relative to one another, usually a few meters. Already bundled parts of the bundle of pipelines 1, so in which the bundling assemblies 2 have already been mounted, are being lowered from the vessel in the direction of the bottom of the body of water. Simultaneously therewith, on board of the vessel bundling assemblies 2 are being mounted in parts of the concerning bundle of pipelines 1 that still have to be bundled. Hence, thanks to such a bundle of pipelines 1, several pipelines can be simultaneously laid down by a single, bundled laying operation, which saves costs and which improves the reliability of the laying operation.

The tensioning straps 21, 22, 23, including their tensioning structures, are usually made from strong and durable metal alloys.

In principle the spacer and/or the covering element of a bundle of pipelines according to the invention can be made from various materials. For example, the spacer 3 and/or the covering element 4 is/are manufactured from plastic, by, for instance, injection moulding in a mould/moulds. A suitable material for manufacturing the spacer 3 and/or the covering element 4 is, for instance, a foamed plastic, and more particularly a Polyethylene (PE), or, for instance, a highly impact resistant PE composition manufactured by injection moulding in a mould. As a result, the element concerned is not only light, but can also be manufactured from re-used plastic, which is environmentally friendly. For instance, the spacer 3 and/or the covering element 4 can be manufactured from Low Density Polyethylene (LDPE). Another suitable material for the spacer 3 and/or the covering element 4 is polypropylene (PP). Such a material also has a high dimensional stability at higher temperatures and can for example be utilized with first pipelines 11 and/or second pipelines 12 through which fluids at increased temperature are transported.

Figure 2:
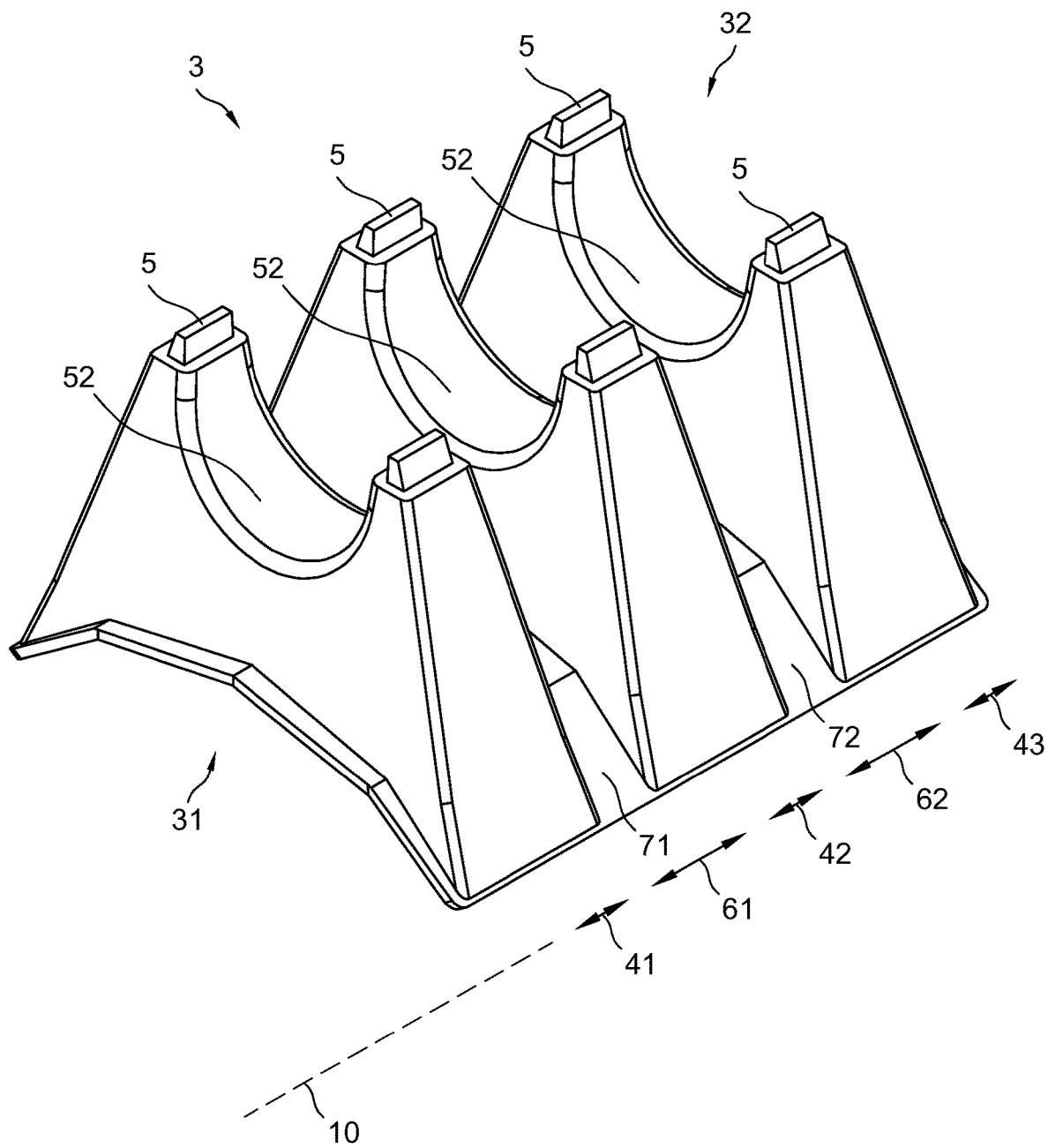
Figure 3:
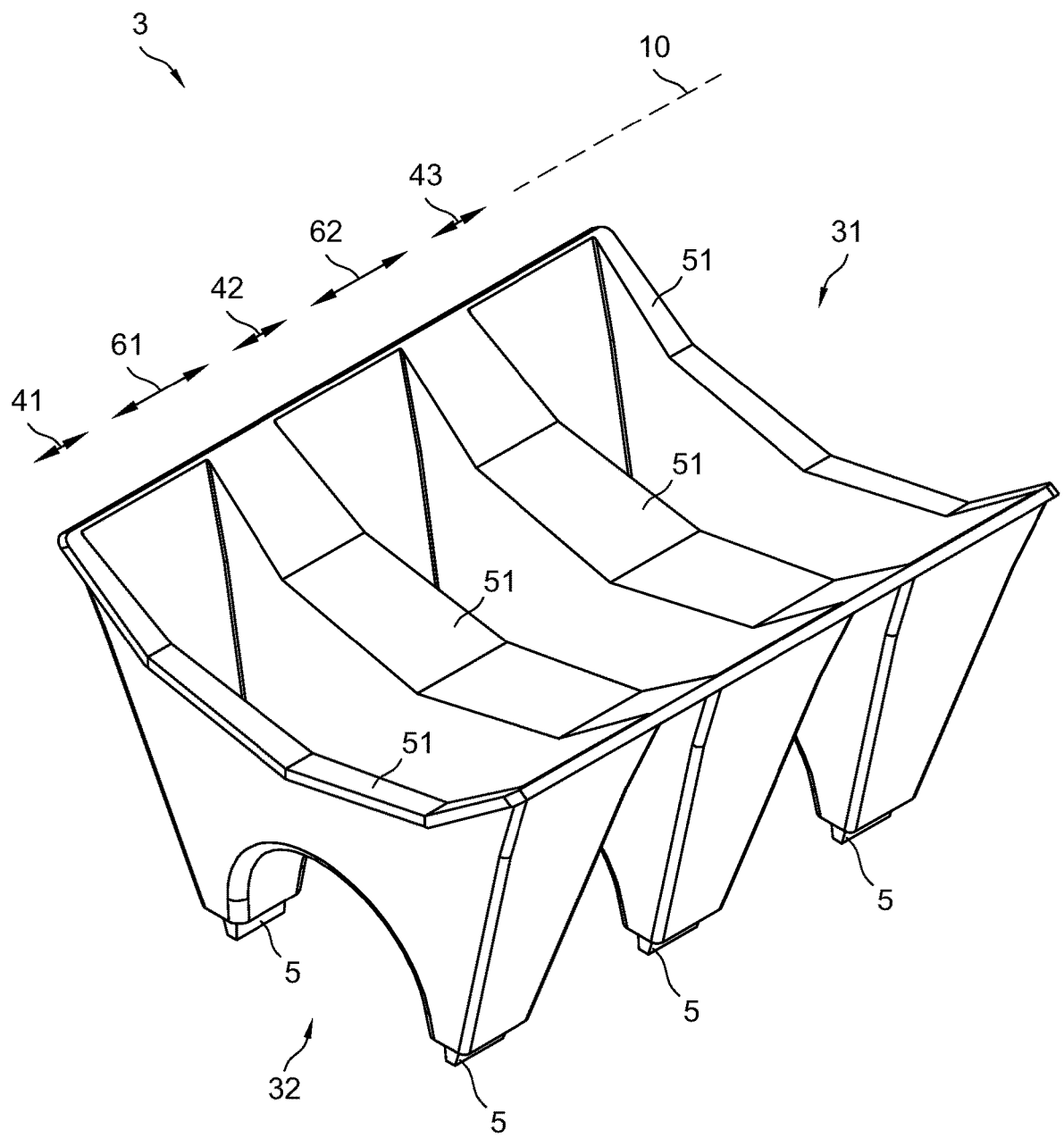
Figure 4:
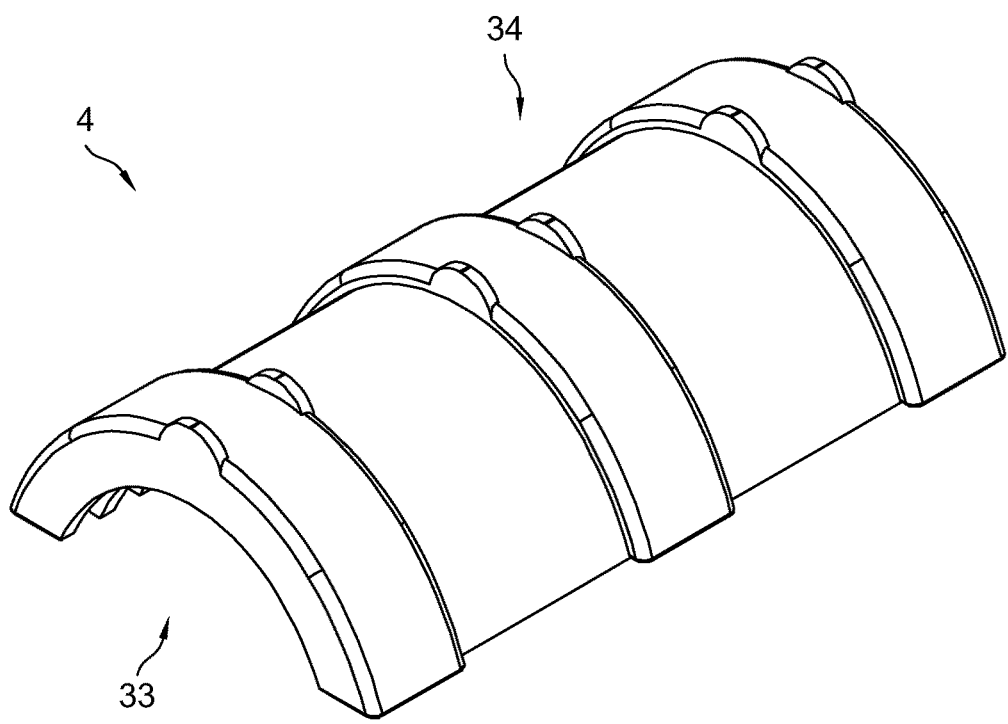
Figure 5:
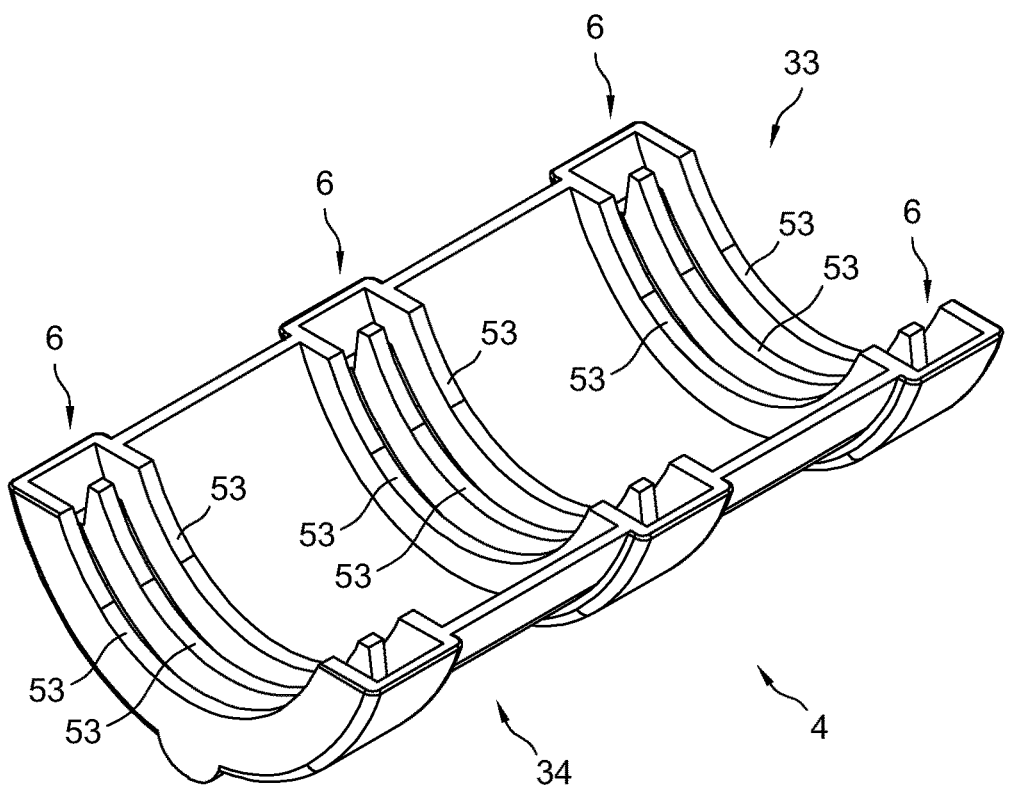
FIG. 5 shows the separate covering element of FIG. 4 again, however this time in a perspective view at the opposed third side of the covering element.

FIGS. 2 and 3 show that the spacer 3 has a number of projections 5 at the second side 32. FIGS. 4 and 5 show that the covering element 4 has a number of receiving holes 6 at the third side 33. In the covering condition of FIG. 1 the projections 5 are interlocking with the receiving holes 6.

FIGS. 2 and 3 further show that the first side 31 is a hollow side of the spacer 3 and that the second side 32 is a bulged side of the spacer 3. These hollow and bulged sides of the spacer 3 are mutually matching in such manner that several ones of such a spacer 3 can be compactly stacked by mutually nesting engagement. See FIGS. 9 and 10, in which two of these spacers 3 are compactly stacked like that.

Figure 8:
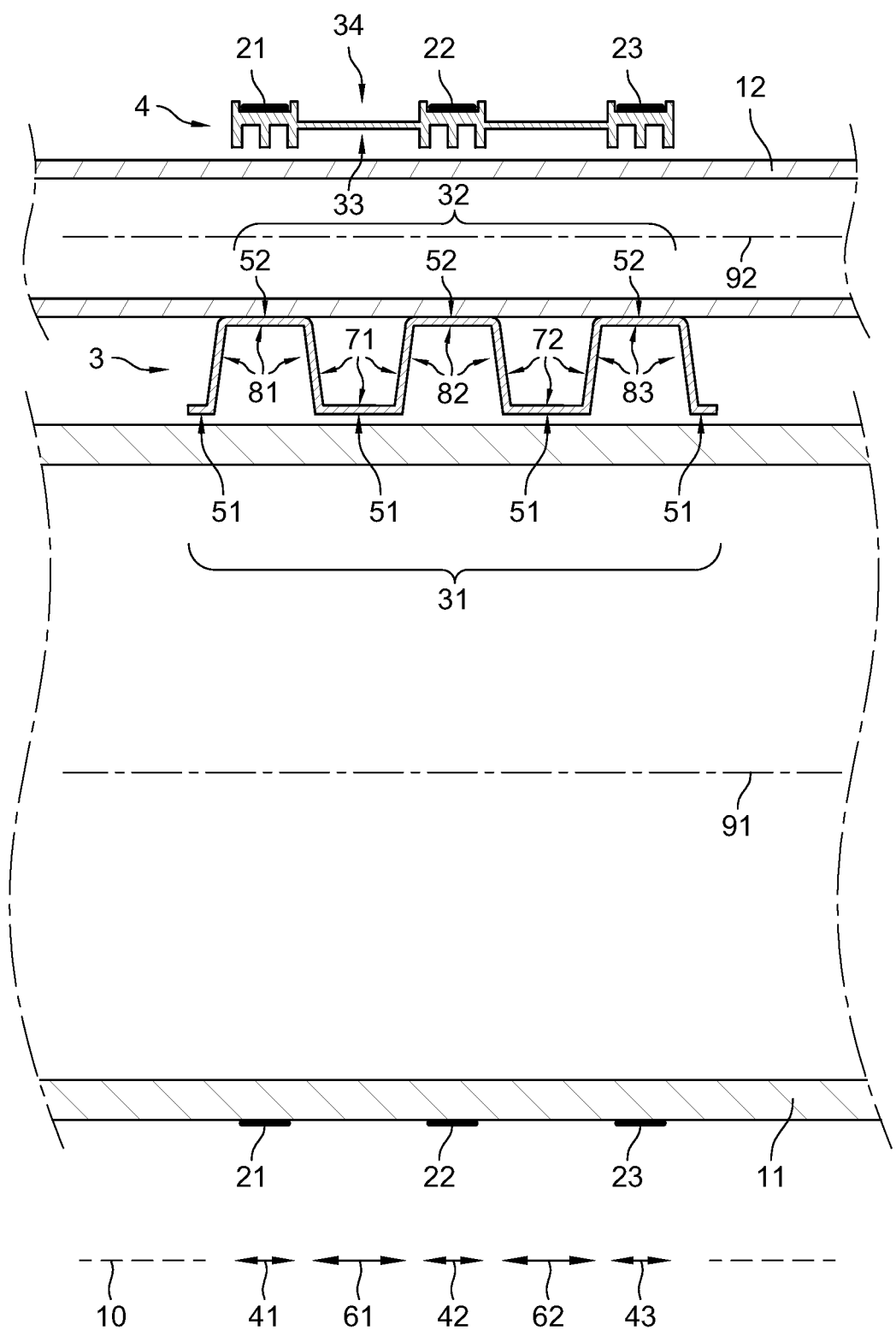
FIG. 8 shows a mid-longitudinal cross-sectional plane through the bundle of pipelines shown in FIG. 1.
Figure 9:
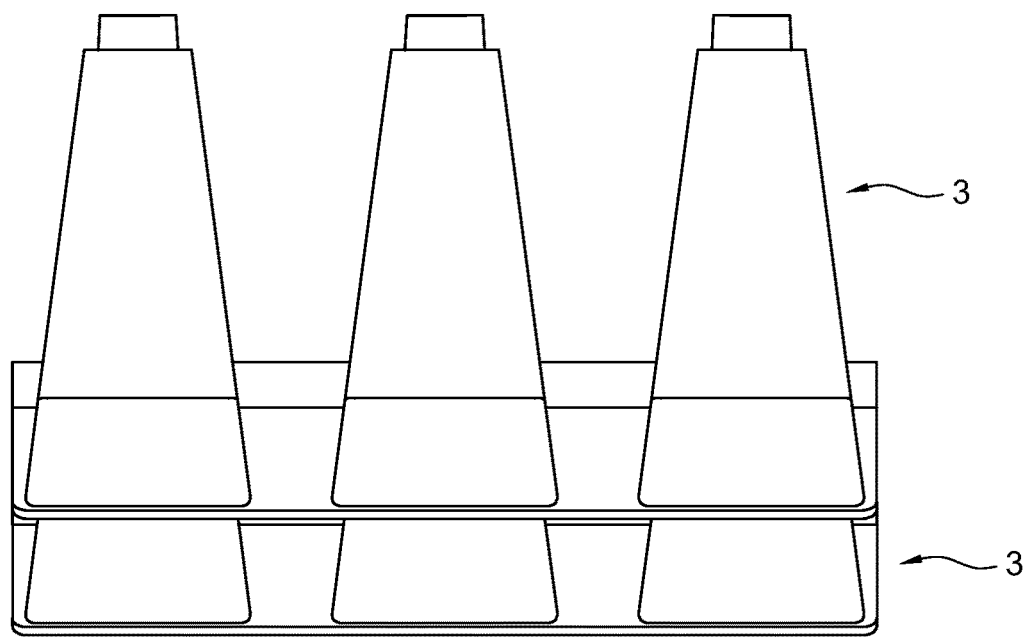
FIG. 9 shows, in a side view perpendicular to the longitudinal direction, two spacers of the type shown in FIGS. 2 and 3, wherein the two spacers are compactly stacked by nesting.
Figure 10:
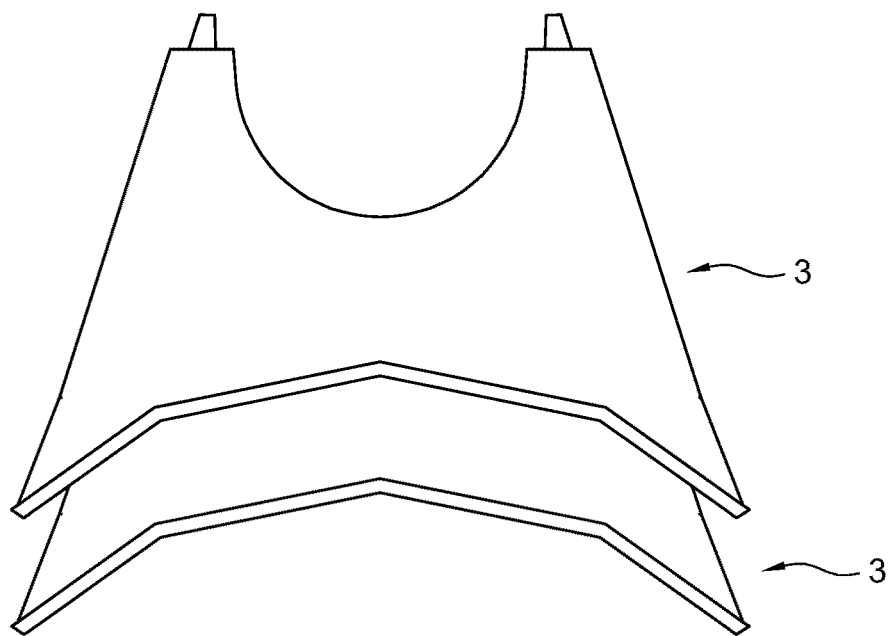
FIG. 10 shows the situation of FIG. 9 again, however this time in a side view parallel to the longitudinal direction.

Furthermore, especially the combination of FIGS. 2, 3 and 8 illustrates, inter alia, the following geometrical features.

At the first side 31 of the spacer 3: the first abutment structure 51, which, in the shown example, is extending inter alia in the first intermediate longitudinal range 61 and in the second intermediate longitudinal range 62, at the second side 32 of the spacer 3: the second abutment structure 52, which, in the shown example, is extending inter alia in the first longitudinal range 41, in the second longitudinal range 42 and in the third longitudinal range 43, and at the second side 32 of the spacer 3: the first recessed intermediate surface portion 71 and the second recessed intermediate surface portion 72, which, in the shown example, are extending inter alia in the first intermediate longitudinal range 61 and in the second intermediate longitudinal range 62, respectively.

By these geometrical features according to the invention, there are formed, so to say, three mutually connected "towers" of the spacer 3. These three "towers" are best seen in FIG. 2 and in FIG. 9. Thanks to these three towers, the portions of the spacer 3 that are extending in the longitudinal ranges 41, 42, 43 are, under influence of the tensioning forces of the tensioning straps 21, 22, 23, to a larger extent independently resiliently compressible relative to one another in directions transverse to the longitudinal direction 10, as compared to the case of, for example, the spacer of the bundle of pipelines known from FIG. 4 of WO 2012/141583 A1 as discussed in the above introduction. The independently compressing towers according to the invention provide the favourable result that, when maximally tensioning each next tensioning strap, the previously tensioned tensioning strap does not get looser, as is the case when applying the spacer known from WO 2012/141583 A1. Therefore this improves the effectivity of the tensioning straps, for example when the tensioning straps 21, 22, 23 are tensioned one after the other.

Figure 6:
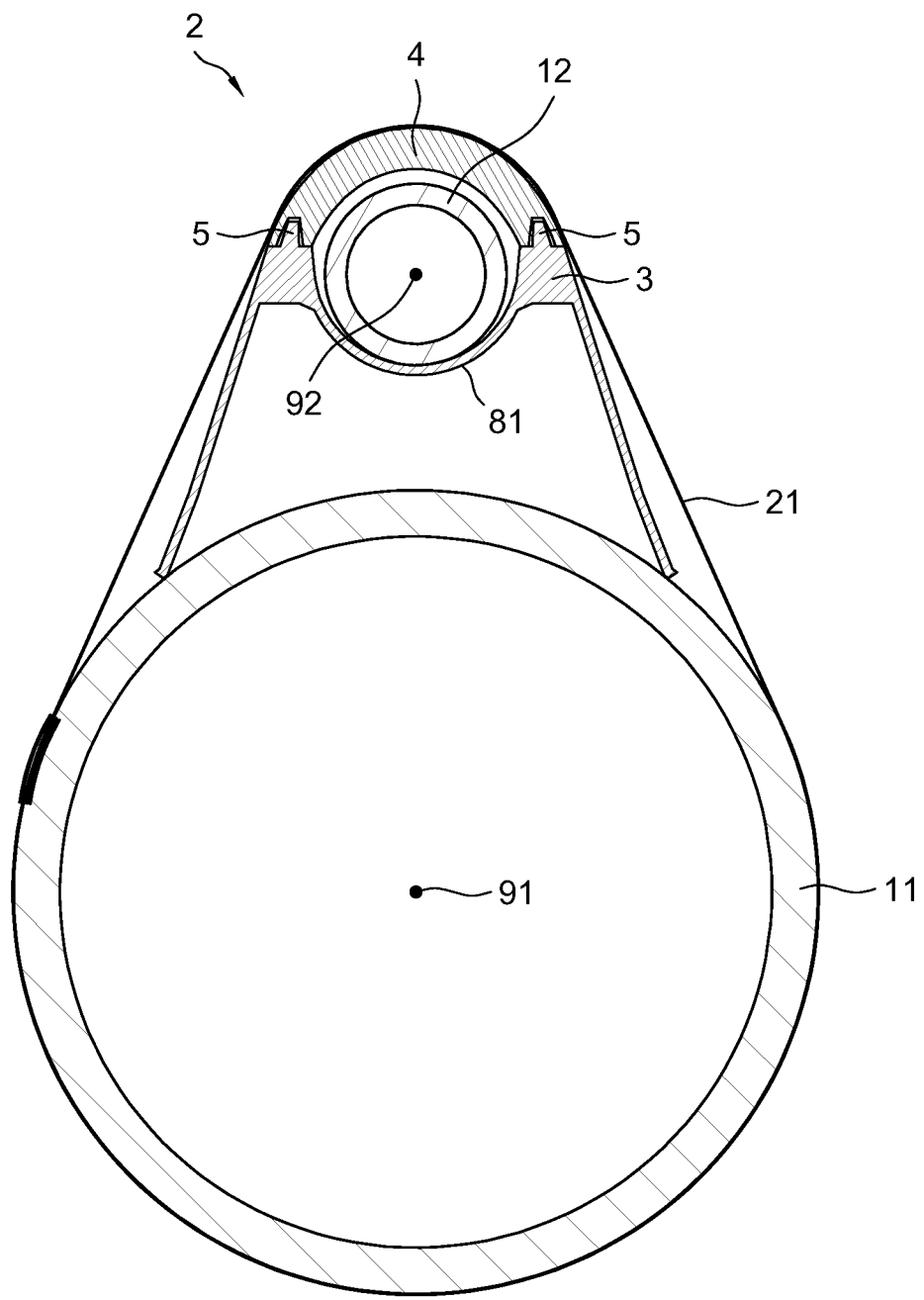
FIG. 6 shows a transverse cross-sectional plane, taken perpendicularly to the longitudinal direction, through the bundle of pipelines shown in FIG. 1, wherein the shown transverse cross-sectional plane is taken in the middle of the first longitudinal range in the longitudinal direction.

Furthermore especially the combination of FIGS. 8, 6 and 3 illustrates, inter alia, the following additional geometrical features.

At the first side 31 of the spacer 3: the first recessed flanking surface portion 81, the second recessed flanking surface portion 82 and the third recessed flanking surface portion 83, which in the shown example are extending inter alia in the first longitudinal range 41, in the second longitudinal range 42, and in the third longitudinal range 43, respectively.

Thanks to these recessed surface portions 81, 82, 83 of the first side 31 of the spacer 3, the spacer can be designed with relatively little material, and at the same time it can withstand high forces during use, and at the same time it can be designed for being nested so that several spacers can be compactly stacked by nesting.

Figure 7:
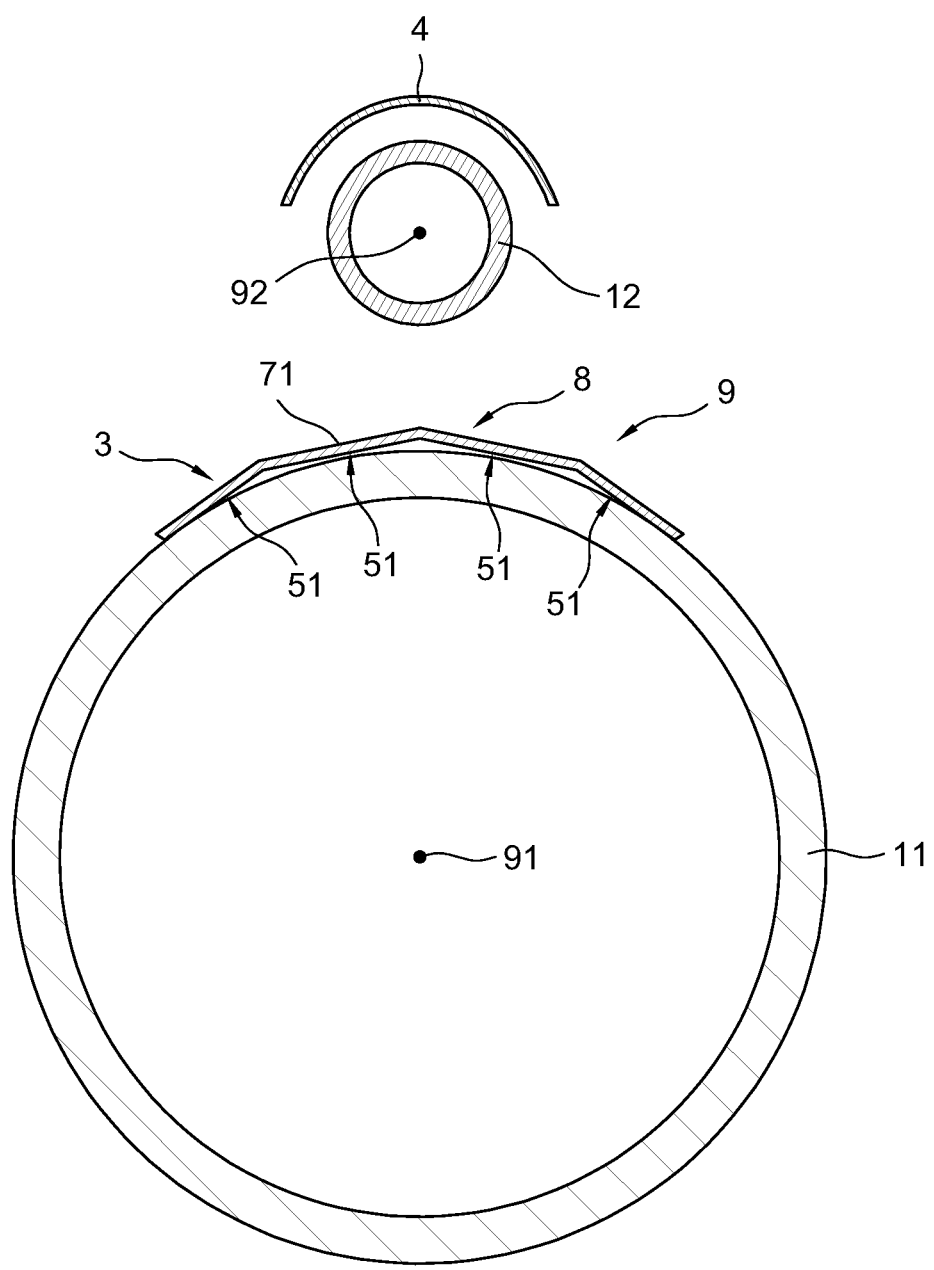
FIG. 7 shows a transverse cross-sectional plane, taken perpendicularly to the longitudinal direction, through the bundle of pipelines shown in FIG. 1, wherein the shown transverse cross-sectional plane is taken in the middle of the first intermediate longitudinal range in the longitudinal direction.

Furthermore especially the combination of FIGS. 3 and 7 inter alia shows the above-mentioned V-shaped part 8 of the first abutment structure 51. In the shown example, the V-shaped part 8 is part of the plurally V-shaped part 9.

It is noted that the above-mentioned examples of embodiments do not limit the invention and that within the scope of the accompanying claims, various alternatives are possible.

For instance, various variations are possible with regard to the shapes, dimensions and materials of a spacer and/or a covering element of a bundle of pipelines of the pipeline bundling assembly according to the invention. Also, a spacer of a bundle of pipelines according to the invention can space apart more than two pipelines in a mutually parallel manner in the longitudinal direction. Furthermore, embodiments of the invention are possible without applying a covering element.

These and similar alternatives are understood to fall within the framework of the invention as defined in the appended claims.

The invention claimed is:

1. A bundle of pipelines comprising:
a first pipeline;
a second pipeline; and
a plurality of bundling assemblies, wherein:
the first pipeline and the second pipeline are extending alongside one another in a mutually parallel manner in a longitudinal direction of the bundle of pipelines, wherein the bundling assemblies in the longitudinal direction are positioned at a distance from one another;
each bundling assembly comprises a spacer and at least two tensioning straps, wherein the spacer is mutually spacing apart the first pipeline and the second pipeline in a direction perpendicular to the longitudinal direction, wherein the spacer comprises a first side and a second side, lying opposite to the first side, wherein the first side is facing the first pipeline and the second side is facing the second pipeline, wherein, as seen in a circumferential direction around the longitudinal direction, the first side partially envelopes the first pipeline and the second side partially envelopes the second pipeline, and wherein the at least two tensioning straps in the longitudinal direction are positioned at a distance from one another, wherein each tensioning strap as one closed loop is surrounding the first pipeline, the spacer and the second pipeline together in said circumferential direction, and wherein tensioning force of the at least two tensioning straps is fixing the spacer relative to the first pipeline;
the at least two tensioning straps comprise a first tensioning strap and a second tensioning strap, wherein the first tensioning strap is extending in a first longitudinal range in the longitudinal direction and the second tensioning strap is extending in a second longitudinal range in the longitudinal direction; and
the spacer comprises, at the first side, a first abutment structure for abutting against the first pipeline and comprises, at the second side, a second abutment structure for abutting against the second pipeline, wherein the second abutment structure is extending at least in the first longitudinal range and in the second longitudinal range; and
the second abutment structure of the spacer, as seen in the longitudinal direction, is at least partly interrupted in a first intermediate longitudinal range in-between the first longitudinal range and the second longitudinal range in that the second side of the spacer comprises, in the first intermediate longitudinal range, a first recessed intermediate surface portion, which, relative to the second abutment structure in the first longitudinal range and in the second longitudinal range, is recessed in the direction of the first abutment structure of the spacer.

2. The bundle of pipelines according to claim 1, wherein:
the at least two tensioning straps further comprise a third tensioning strap, wherein the third tensioning strap is extending in a third longitudinal range in the longitudinal direction, wherein the second longitudinal range is extending in-between the first longitudinal range and the third longitudinal range; and
the second abutment structure is furthermore at least extending in the third longitudinal range, and the second abutment structure, as seen in the longitudinal direction, is at least partly interrupted in a second intermediate longitudinal range in-between the second longitudinal range and the third longitudinal range in that the second side in the second intermediate longitudinal range comprises a second recessed intermediate surface portion, which, relative to the second abutment structure in the first longitudinal range and in the second longitudinal range and in the third longitudinal range, is recessed in the direction of the first abutment structure.

3. The bundle of pipelines according to claim 2, wherein:
the first abutment structure is extending at least in the first intermediate longitudinal range and in the second intermediate longitudinal range, and the first abutment structure, as seen in the longitudinal direction, is at least partly interrupted in the first longitudinal range and in the second longitudinal range and in the third longitudinal range in that the first side in the first longitudinal range and in the second longitudinal range and in the third longitudinal range comprises a first recessed flanking surface portion and a second recessed flanking surface portion and a third recessed flanking surface portion, respectively, which, relative to the first abutment structure in the first intermediate longitudinal range and in the second intermediate longitudinal range, are recessed in the direction of the second abutment structure.

4. The bundle of pipelines according to claim 1, wherein:
the first abutment structure is extending at least in the first intermediate longitudinal range, and the first abutment structure, as seen in the longitudinal direction, is at least partly interrupted in the first longitudinal range and in the second longitudinal range in that the first side in the first longitudinal range and in the second longitudinal range comprises a first recessed flanking surface portion and a second recessed flanking surface portion, respectively, which, relative to the first abutment structure in the first intermediate longitudinal range, are recessed in the direction of the second abutment structure.

5. The bundle of pipelines according to claim 1, wherein, as seen in transverse cross-section perpendicular to the longitudinal direction, the first abutment structure comprises a substantially V-shaped part, wherein the V-shaped part with a point of its V-shape faces away from a central axis of the first pipeline.

6. The bundle of pipelines according to claim 5, wherein, as seen in transverse cross-section perpendicular to the longitudinal direction, the first abutment structure comprises a substantially plurally V-shaped part, wherein the plurally V-shaped part with respective points of its plural V-shape faces away from a central axis of the first pipeline.

7. The bundle of pipelines according to claim 1, wherein each bundling assembly further comprises a covering element which comprises a third side and a fourth side lying opposite to the third side, wherein the third side is facing the second pipeline and the fourth side is facing away from the second pipeline, wherein the covering element at the third side comprises a third abutment structure for abutting against the second pipeline, wherein the covering element, by interlocking connection with the spacer, has been brought in a covering condition, wherein in said covering condition the spacer and the covering element are facing one another with the second side and the third side, respectively, wherein, as seen in said circumferential direction, the third side partially envelopes the second pipeline, and wherein each tensioning strap as one closed loop is surrounding the first pipeline, the spacer, the second pipeline and the covering element together in said circumferential direction.

* * * * *

UNITED STATES PATENT AND TRADEMARK OFFICE
CERTIFICATE OF CORRECTION

| | | |
|---|---|---|
| PATENT NO. | : 11,536,399 B2 | Page 1 of 1 |
| APPLICATION NO. | : 17/427993 | |
| DATED | : December 27, 2022 | |
| INVENTOR(S) | : Gijs Alewijn | |

It is certified that error appears in the above-identified patent and that said Letters Patent is hereby corrected as shown below:

On the Title Page

Item (73), remove "HEINEKEN SUPPLY CHAIN B.V.," as the Assignee and insert --Lankhorst Engineered Products B.V.,--

Signed and Sealed this
Twenty-fifth Day of April, 2023

Katherine Kelly Vidal
*Director of the United States Patent and Trademark Office*